United States Patent [19]

Arai

[11] Patent Number: 5,010,421
[45] Date of Patent: Apr. 23, 1991

[54] VARIABLE SPEED SOUND REPRODUCING APPARATUS FOR SOUND REPRODUCTION AND REVIEW SYSTEM

[75] Inventor: Takeshi Arai, Saitama, Japan

[73] Assignee: Sanyo Electric Co., Ltd., Osaka, Japan

[21] Appl. No.: 284,878

[22] Filed: Dec. 15, 1988

[30] Foreign Application Priority Data

Dec. 16, 1987 [JP] Japan .................................. 57-319321

[51] Int. Cl.$^5$ .............................................. G11B 5/09
[52] U.S. Cl. ................................................... 360/32
[58] Field of Search ........................ 360/32, 72.2, 72.3

[56] References Cited

U.S. PATENT DOCUMENTS

4,853,803 8/1989 Fukatsu ............................. 360/72.2

Primary Examiner—Vincent P. Canney
Attorney, Agent, or Firm—Armstrong, Nikaido, Marmelstein, Kubovcik, & Murray

[57] ABSTRACT

A sound reproducing apparatus converts a sound signal reproduced in a 5 multiple speed reverse reproduction mode into a digital signal by pulses obtained by frequency-multiplying reference sampling pulses by 5 to write the digital signal in a memory 12, and reads out the digital signal by the reference sampling pulses to convert the same to an analog signal. Reading of the signal from memory 12 is performed in response to a read address changed in one direction in a predetermined cycle. Writing of a signal to the memory 12 is performed by using address information changed in the direction opposite to that of the read address signal at a speed five times that of a read address signal as a write address in a cycle corresponding to five-sixth of the cycle of the read address signal and only during a period corresponding to one-sixth of the cycle thereof. Thus, writing is performed with the address being reversed, so that a reproduced sound signal which is considerably long continuous can be derived without interruption even in the reverse reproduction mode.

3 Claims, 4 Drawing Sheets

VARIABLE SPEED SOUND REPRODUCING APPARATUS FOR SOUND REPRODUCTION AND REVIEW SYSTEM

BACKGROUND OF THE INVENTION

1. Field of the Invention

The present invention relates generally to a sound reproducing apparatus, and more particularly, to a sound reproducing apparatus for continuously deriving a sound signal reproduced from a sound recording media such as a tape at a speed at the time of recording in a special reproduction mode such as a so-called review reproduction, in an apparatus having at least a sound reproducing mechanism such as a video tape recorder and an audio tape recorder.

2. Description of the Background Art

In general, in an apparatus having at least a sound reproducing mechanism such as a video tape recorder or an audio tape recorder, there exists a special reproducing mechanism such as a review mechanism for accessing a desired position to be reproduced by reproducing a sound signal while traveling a tape having, for example, the sound signal recorded thereon at high speed in the direction opposite of the normal reproduction mode.

However, when the sound signal is reproduced by such a review mechanism, the sound signal is reproduced in reverse, so that the meaning of the sound can not be grasped. In addition, since the reproduced sound signal is time-base-compressed, the frequency thereof is high, so that it is more difficult to confirm the content thereof.

In order to solve this problem, a technique has been proposed in which in the above described review reproduction, a reproduced sound signal is stored in a memory at a speed proportional to a review reproducing speed, and after storing is completed, the reproduced sound signal is read out from the memory while being time-base-expanded to derive the same at the original speed, which is disclosed in, for example, Japanese Patent Laying-Open Gazette No. 45607/1984.

However, according to such a technique, derivation of the sound signal is interrupted while the reproduced sound signal is being written into the memory. Therefore, the reproduced sound signal is always written in a memory to and from which writing and reading can be performed in parallel at the speed corresponding to the tape speed while being read out from the memory in the order opposite to that in writing. However, since the writing speed of the reproduced sound signal is fast and memory capacity is limited, the period is shortened in which the reproduced sound signal read out from the memory is continuous. More specifically, the sound signal to be derived becomes a sound signal having many discontinuous portions. Thus, if the memory capacity is increased, this problem can be solved. However, there is an associated increase in cost as a result.

SUMMARY OF THE INVENTION

Therefore, an object of the present invention is to provide a sound reproducing apparatus capable of continuously deriving a sound signal of a considerable length even during reverse reproduction such as review reproduction.

Another object of the present invention is to provided a sound reproducing apparatus capable of deriving a reproduced sound signal even in a special reproduction mode without requiring an increased memory size.

Briefly stated, a sound reproducing apparatus according to the present invention includes a circuit for scanning a recording media having at least a sound signal recorded thereon at a predetermined recording speed, in the direction opposite to that at the time of recording at a reproducing speed N (N: positive integer) times the predetermined recording speed to reproduce the sound signal; a memory to and from which a digital signal can be written and read out; a read address generating circuit for generating a read address signal changed in one direction in a predetermined cycle for specifying an address at which the digital signal is to be read out from the memory; a circuit for generating address information changed in the direction opposite to that of the read address signal at a speed N times that of the read address signal; a write address generating circuit for supplying the above described address information as a write address signal for specifying an address at which the digital signal is to be written to the memory in a cycle corresponding to $N/(N+1)$ times the predetermined cycle of the read address signal and only during a first period corresponding to $1/(N+1)$ times the above described predetermined cycle of the read address signal; an address selecting circuit for supplying the read address signal to the memory when the read address signal is generated and supplying the write address signal to the memory when the write address signal is generated in the first period; circuit for converting the sound signal reproduced by the reproducing circuit into a digital signal at a first speed proportional to the reproducing speed and writing the same to the address specified by the write address signal in the memory; and a circuit for reading out the digital sound signal from the address specified by the read address signal in the memory at a second speed proportional to the recording speed and converting the same into an analog signal.

In accordance with another aspect of the present invention, the sound reproducing apparatus includes a circuit for scanning a recording media having at least a sound signal recorded thereon at a predetermined recording speed, in the same direction as that at the time of recording at a reproducing speed of one-half of the predetermined recording speed to reproduce a sound signal; a memory to and from which a digital signal can be written and read out; a read address generating circuit for generating a read address signal changed in one direction in a predetermined cycle for specifying an address at which the digital signal is to be read out from the memory; a write address generating circuit for generating a write address signal changed in the same direction as that of the read address signal in synchronization with the initiation of the change in the read address signal and in a cycle two times the predetermined cycle of the read address signal for specifying an address at which the digital signal is to be written to the memory; an address selecting circuit for supplying the read address signal to the memory when the read address signal is generated and supplying the write address signal to the memory when the write address signal is generated; a circuit for converting the sound signal reproduced by the reproducing circuit into a digital signal at a first speed proportional to the reproducing speed and writing the same to the address specified by the write address signal in the memory; and a circuit for reading out the digital sound signal from the address specified by the read address signal in the memory at a second speed proportional to the recording speed and converting the same into an analog signal.

In accordance with still another aspect of the present invention, the sound reproducing apparatus includes a circuit for scanning a recording media having at least a sound signal recorded thereon at a predetermined recording speed, in the same direction as that at the time of recording at a reproducing speed two time the predetermined recording speed to reproduce the sound signal; a memory to and from which a digital signal can be written and read out; a read address generating circuit for generating a read address signal changed in one direction in a predetermined cycle for specifying an address at which the digital signal is to be read out from the memory; a circuit for generating address information changed in the same direction as that of the read address signal at a speed two times that of the read address signal; a write address generating circuit for supplying the address information as a write address signal for specifying an address at which the digital signal is to be written to the memory in a cycle two times the predetermined cycle of the read address signal and only during a first period corresponding to the predetermined cycle of the read address signal; an address supplying circuit for supplying the read address signal to the memory when the read address signal is generated and supplying the write address signal to the memory when the write address signal is generated in the first period; a circuit for converting the sound signal reproduced by the reproducing circuit into a digital signal at a first speed proportional to the reproducing speed and writing the same to an address specified by the write address signal in the memory; and a circuit for reading out the digital sound signal from the address specified by the read address signal in the memory at a second speed proportional to the recording speed and converting the same into an analog signal.

Thus, a principal advantage of the present invention is that the reproduced sound signal is written to the memory with the address being reversed at a speed N times the recording speed in a period $1/(N+1)$ times the cycle of the read address signal, and the sound signal as written is continuously read out in a cycle $N/(N+1)$ times the above described cycle of the read address signal, so that the reproduced sound signal of a considerable length can be derived without interruption even during reverse reproduction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
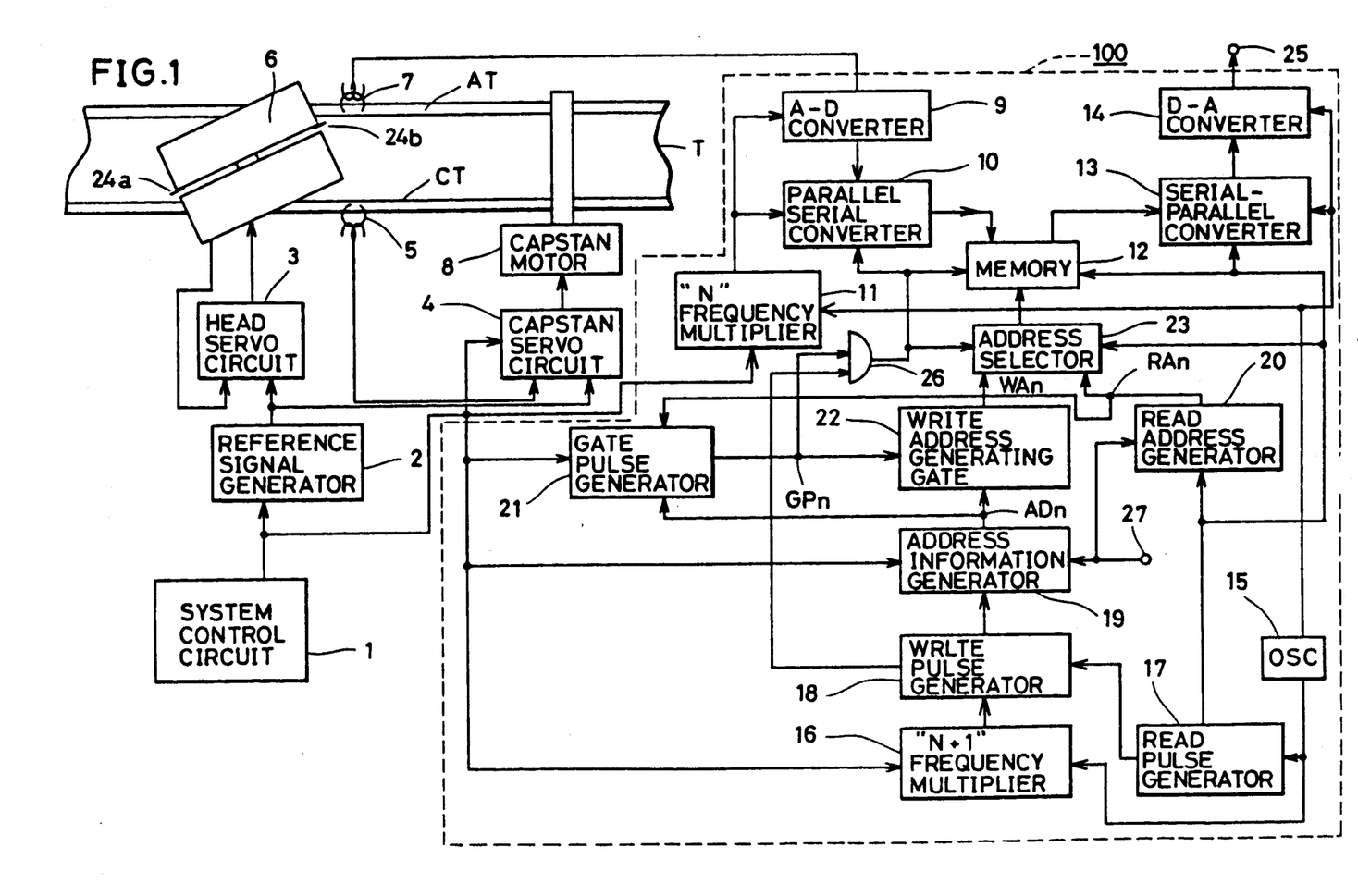
FIG. 1 is a schematic block diagram showing a sound reproducing apparatus in a video tape recorder according to one embodiment of the present invention.

FIG. 1 is a schematic block diagram showing a sound reproducing apparatus in a video tape recorder (referred to as VTR hereinafter) having a special reproducing mechanism such as multiple speed reproduction according to one embodiment of the present invention.

In the VTR shown in FIG. 1, a system control circuit 1 generates a mode designating signal for designating various reproduction modes, to apply the same to a reference signal generator 2, a capstan servo circuit 4 and a sound signal processor 100. In the embodiment shown in FIG. 1, the modes designated by the system control circuit 1 include a 2 multiple speed reproduction mode, a 5 multiple speed reproduction mode, a 9 multiple speed reproduction mode, a −5 multiple speed reproduction mode, a −9 multiple speed reproduction mode and a ½ multiple speed reproduction mode, in addition to a normal reproduction mode. The mode designating signal includes information concerning multiple speed and information concerning direction. In general, in a ±N (N: positive number) multiple speed reproduction mode, the information concerning multiple speed indicates the absolute value N of a number of multiple speed, and the information concerning direction indicates positive and negative signs.

In FIG. 1, the reference signal generator 2 generates a reference signal having a frequency switched in response to the mode designating signal generated from the system control circuit 1, to apply the same to a head servo circuit 3 and the capstan servo circuit 4. A cylinder 6, which has video heads 24a and 24b provided thereon, generates a rotation detecting signal indicating the rotational speed of the cylinder itself to apply the same to the head servo circuit 3. The head servo circuit 3 receives the reference signal applied from the reference signal generator 2 and the rotation detecting signal applied from the cylinder 6 to generate a control signal for controlling rotation of a cylinder motor (not shown) in the cylinder 6, so that the video heads 24a and 24b are rotated at a predetermined speed.

Additionally, a reproduced control signal is obtained from a control track CT on a video tape T by a control head 5, to be applied to the capstan servo circuit 4. The capstan servo circuit 4 frequency-divides this reproduced control signal in a predetermined ratio and then, compares in phase the frequency-divided signal with the reference signal from the reference signal generator 2, and controls rotation of a capstan motor 8 at a predetermined speed determined by the mode designating signal from the system control circuit 1. As a result, the video tape T is moved in a designated reproduction mode, so that a sound signal is reproduced from an audio head 7 scanning an audio track AT at a speed corresponding to the travelling speed of the tape.

The following is a description of the sound signal processor 100 in the VTR shown in FIG. 1. First, the mode designating signal from the system control circuit 1 is applied to an "N" frequency multiplier 11, an "N+1" frequency multiplier 16, an address information generator 19 and a gate pulse generator 21 in the sound signal processor 100. Simultaneously, an oscillator (OSC) 15 generates a reference sampling pulse signal of 15 KHz to apply the same to the "N" frequency multiplier 11, a serial-parallel converter 13 and a D/A converter 14, and generates a reference clock pulse signal of 90 KHz to apply the same to the "N+1" frequency multiplier 16 and a read pulse generator 17. Thus, the "N" frequency multiplier 11 frequency-multiplies the reference sampling pulse signal of 15 KHz by N according to the information concerning multiple speed of the mode designating signal (for example, when the mode designating signal designates the 5 multiple speed reproduction mode, it frequency-multiplies the reference sampling pulse signal of 15 KHz by 5, to generate a pulse signal having a frequency of 75 KHz). The output of the "N" frequency multiplier 11 is applied to the A/D converter 9 as a A/D conversion pulse signal, as well as to a parallel-serial converter 10 as a transfer pulse signal. The A/D converter 9 receives a sound signal from the audio head 7 reproduced at a speed proportional to the travelling speed of the tape T, and converts the same into a 6-bit digital sound signal at a speed proportional to the travelling speed of the tape T in response to the A/D conversion pulse signal, and outputs said digital sound signal to parallel-serial converter 10. The parallel-serial converter 10 receives the 6-bit digital sound signal in parallel in response to the transfer pulse signal from the "N" frequency multiplier 11, to serially supply the same to a memory 12 in synchronization with write pulses as described below. Memory 12 is a 256 K-bit random access memory (RAM) to which data is written in response to a write address signal in a write mode and from which data is read out in response to a read address signal in a read mode. The serial-parallel converter 13 converts into data the digital sound signal read out bit by bit from the memory 12 into 6-bit parallel data in response to read pulses as described below. The D/A converter 14 receives the 6-bit parallel data from the serial-parallel converter 13 and converts the same into an analog sound signal in synchronization with the reference sampling pulse signal of 15 KHz from the oscillator 15, to output the same to through an output terminal 25.

The "N+1" frequency multiplier 16 frequency-multiplies by (N+1) the reference clock pulse signal of 90 KHz from the oscillator 15 in response to the information concerning multiple speed of the mode designating signal (for example, when the mode designating signal designates the 5 multiple speed reproduction mode, it frequency-multiplies the reference clock pulse signal by 6). An output of the "N+1" frequency multiplier 16 is applied to a write pulse generator 18. The read pulse generator 17 outputs the reference clock pulse signal of 90 KHz from the oscillator 15 without any modification as read pulses, to apply the same to the write pulse generator 18, a read address generator 20, an address selector 23, memory 12 and the serial-parallel converter 13. The write pulse generator 18 picks out only pulses synchronized in phase with the read pulses from the read pulse generator 17 of the output from the "N+1" frequency multiplier 16 thereby to form write pulses, to apply the same to an address information generator 19 and one input of an AND gate 26. The address information generator 19 enters a count mode by addition when the information concerning direction of the mode designating signal applied from the system control circuit 1 instructs forward direction reproduction and by subtraction when system control circuit 1 instructs opposite direction reproduction. The address information generator 19 is reset by a reset pulse supplied from a signal source (not shown) through input terminal 27 at the timing of setting a mode and then, initiates counting by addition or subtraction of the write pulses from the write pulse generator 18 thereby forming address information ADn, to apply the same to the gate pulse generator 21 and a write address generating gate 22.

The read address generator 20 is also reset by a reset pulse at the time of setting a mode and then, counts by addition of the read pulses from the read pulse generator 17 thereby to form a read address signal RAn, to apply the same to the gate pulse generator 21 and the address selector 23.

The gate pulse generator 21 compares the address information ADn from the address information generator 19 with the read address signal RAn from the read address generator 20 in a manner corresponding to the reproduction mode designated by the mode designating signal from the system control circuit 1 to suitably generate gate pulses GPn as described below, to apply the same to the write address generating gate 22 and the other input of the AND gate 26.

The write address generating gate 22 is opened only in a period during which the gate pulse GPn is generated, to apply the address information ADn from the address information generator 19 to the address selector 23 as a write address signal WAn.

When an output from AND gate 26 attains a high level, that is, when the write pulses from the write pulse generator 18 are generated in a period during which the gate pulse GPn is generated from the gate pulse generator 21, the address selector 23 selects the write address signal WAn from the write address generating gate 22 to input the same to the memory. When the read pulses are generated from the read pulse generator 17, the address selector 23 selects the read address signal RAn from the read address generator 20 to input the same to the memory 12 irrespective of the gage pulses GPn.

More specifically, the memory 12 enters a write mode in response to a high level output from AND gate 26. In this write mode, a sound signal converted into a digital signal by the A-D converter 9 is written bit by bit in response to the write address signal WAn. The memory 12 enters a read mode in response to the read pulses from the read pulse generator 17. In this read mode, the digital sound signal is read out bit by bit in response to the read address signal RAn.

Figure 2A:
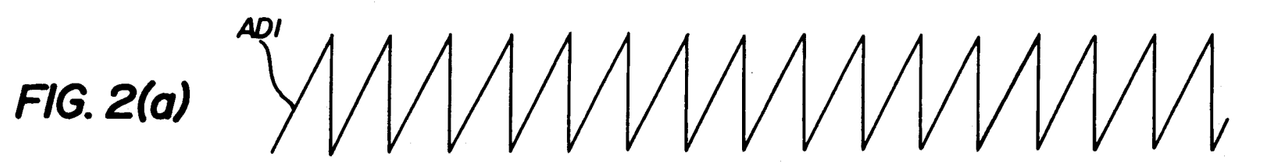
FIG. 2A-C are a timing chart for explaining the operation of the invention in a reproduction mode in which a signal is reproduced at a speed five times that in the normal reproduction mode (referred to as 5 multiple speed reproduction mode hereinafter) according to the embodiment shown in FIG. 1.
Figures 2B, 2C:
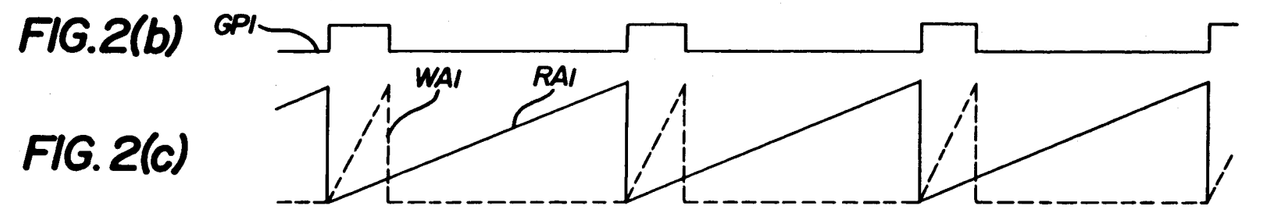
Figure 3A:
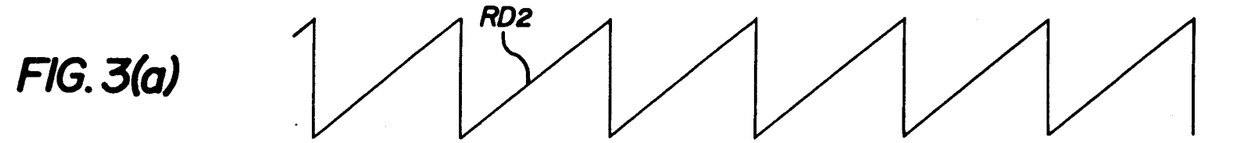
FIG. 3A-C are is a timing chart for explaining the operation in a 2 multiple speed reproduction mode according to the embodiment shown in FIG. 1.
Figures 3B, 3C:
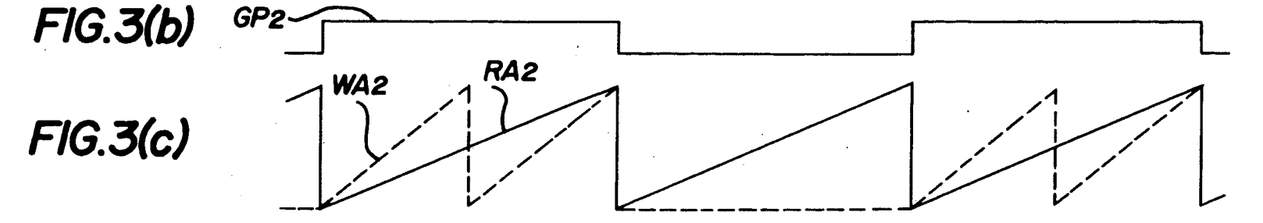
Figure 4A:
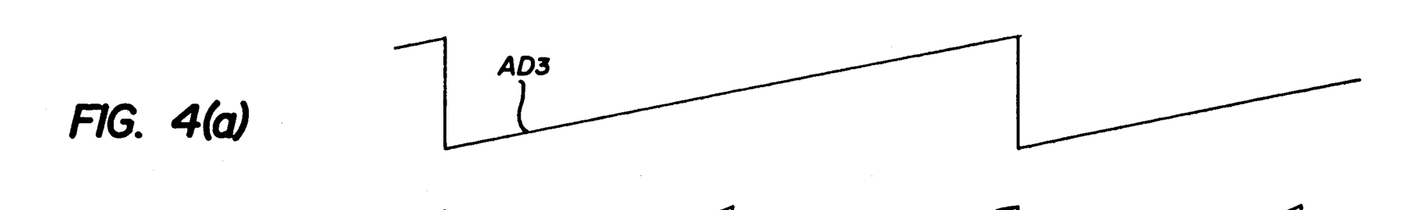
FIG. 4A and B are is a timing chart for explaining the operation in a ½ multiple reproduction mode according to the embodiment shown in FIG. 1.
Figure 4B:
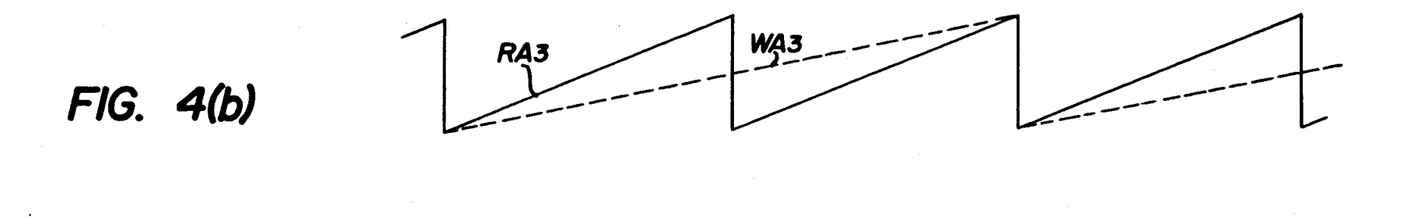
Figure 5A:
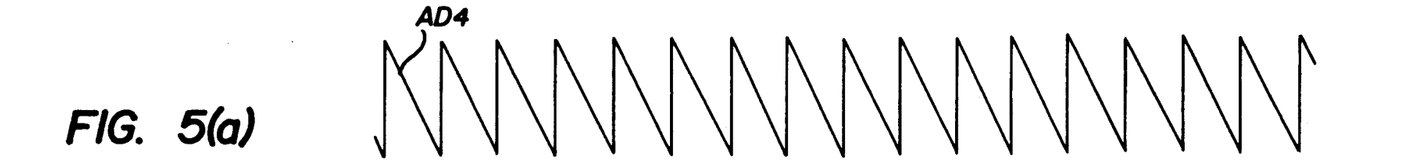
FIG. 5A-C are is a timing chart for explaining the operation in a −5 multiple speed reproduction mode according to the embodiment shown in FIG. 1.
Figures 5B, 5C:
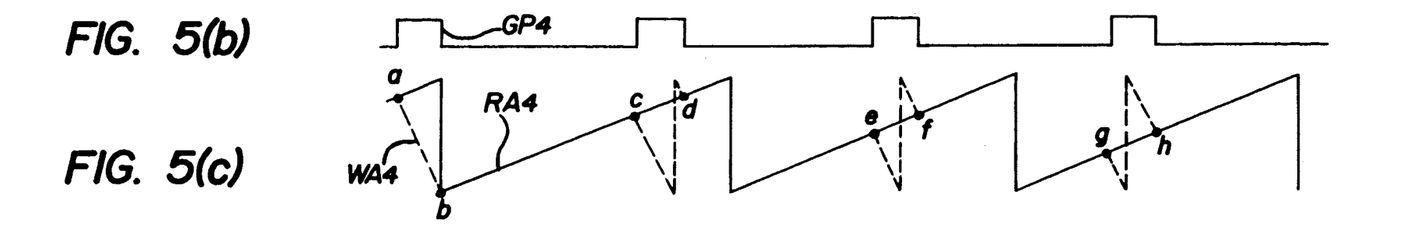
Figures 6A, 6B:
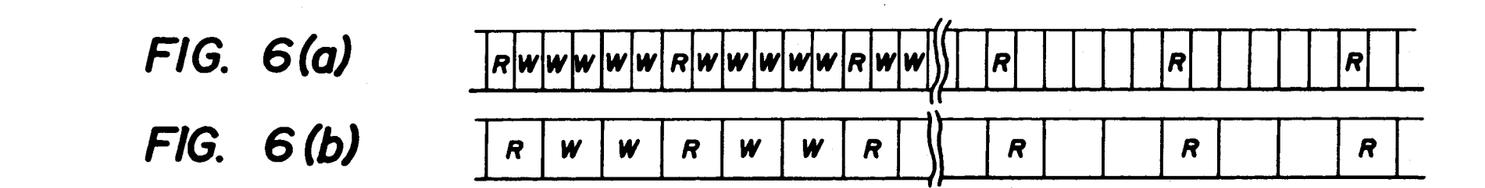
FIG. 6A-D are is a diagram for explaining timings for writing and reading to and from a memory in various reproduction modes shown in FIGS. 2 to 5.
Figure 6C:
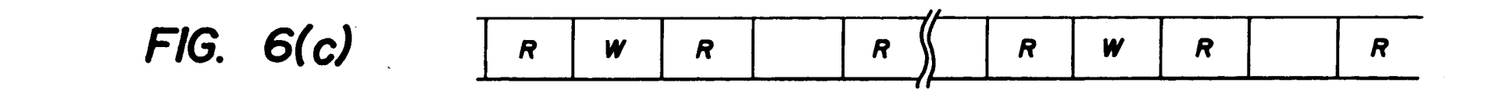
Figure 6D:
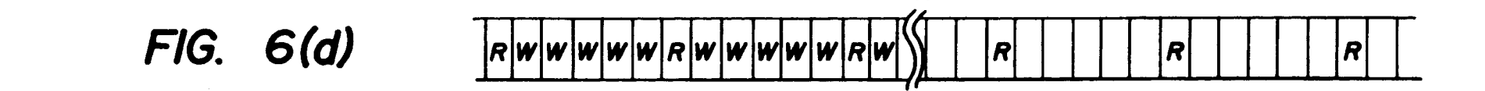

FIG. 2 is a timing chart for explaining an operation in the 5 multiple speed reproduction mode according to the embodiment shown in FIG. 1, FIG. 3 is a timing chart for explaining an operation in the 2 multiple speed reproduction mode, FIG. 4 is a timing chart for explaining an operation in the ½ multiple speed reproduction mode, FIG. 5 is a timing chart for explaining an operation in the −5 multiple speed reproduction mode, and FIG. 6 is a diagram for explaining timings for writing and reading to and from the memory 12 in each of the above described reproduction modes.

Referring now to FIGS. 1 to 6, description is made on an operation according to the embodiment of the present invention.

(1) 5 multiple speed reproduction mode:

In the 5 multiple speed reproduction mode, an operation of writing a reproduced sound signal to the memory 12 at a writing speed five times a predetermined reading speed is performed, and a reading operation is also performed at the above described predetermined reading speed simultaneously with the initiation of this writing operation and then, the next writing operation and reading operation are further performed at the time point when this reading operation is terminated. Thus, even at the time of 5 multiple speed reproduction mode, a continuous reproduced sound signal of a considerable length can be derived without interruption.

More specifically, in the embodiment shown in FIG. 1, the reference sampling pulse signal of 15 KHz from the oscillator 15 is applied to the "N" frequency multiplier 11. This "N" frequency multiplier 11 frequency-multiplies the reference sampling pulse signal of 15 KHz by 5 according to the information concerning multiple speed of the mode designating signal from the system control circuit 1, to supply a pulse signal of 75 KHz to the A-D converter 9 as a A-D conversion pulse signal. A 6-bit digital sound signal obtained by this A-D converter 9 is transferred to the parallel-serial converter 10, to be serially supplied to the memory 12. Every time a write address signal $WA_1$ supplied from the write address generating gate 22 through the address selector 23 is changed, the digital sound signal is written bit by bit to the 256 K-bit memory 12.

The reference clock pulse signal of 90 KHz from the oscillator 15 is applied to the "N+1" frequency multiplier 16. This "N+1" frequency multiplier 16 frequency-multiplies the reference clock pulse signal of 90 KHz by 6 according to the information concerning multiple speed of the mode designating signal from the system control circuit 1. In addition, the read pulse generator 17 outputs the reference clock pulse signal of 90 KHz applied from the oscillator 15 without any modification as read pulses, and applies them to the read address generator 20. This read address generator 20 counts the read pulses corresponding to the capacity of the memory 12, thereby forming a read address signal $RA_1$ (represented by a solid line in FIG. 2(c)).

The write pulse generator 18 stops the passage of an output from the "N+1" frequency multiplier 16 when read pulses are generated by the read pulse generator 17. Thus, the write pulse generator 18 continuously generates write pulses five times and ceases generation of the write pulses when the read pulses are generated. The write pulses are applied to the address information generator 19. This address information generator 19 counts the applied write pulses corresponding to the capacity of the memory 12, thereby address information $AD_1$ (in FIG. 2(a)) changed at a speed five times that of the read address signal $RA_1$. Meanwhile, the read address generator 20 and the address information generator 19 are simultaneously reset by a common reset pulse in an initial state, so that the read address signal $RA_1$ and the address information $AD_1$ are defined to have a predetermined phase relation.

Considering a case in which the mode designating signal designates the 5 multiple speed reproduction mode, every time the read address generator 20 completes counting of the read pulses corresponding to the memory capacity so that the read address signal $RA_1$ returns to the initial state, the gate pulse generator 21 generates a gate pulse $GP_1$ (in FIG. 2(b)) until the address information generator 19 completes counting of the write pulses corresponding to the memory capacity. The write address generating gate 22 is opened in a period of generation of the gate pulse $GP_1$ in response to the gate pulse $GP_1$, to output information corresponding to one circulating period of the address information $AD_1$ as a write address signal $WA_1$ (represented by a broken line in FIG. 2(c)).

Thus, as shown in FIG. 2, respective timings of initial values of the write address signal $WA_1$ and the read address signal $RA_1$ are common to each other. In addition, when the read address signal $RA_1$ circulates once at a predetermined speed, the write address signal $WA_1$ circulates once at a speed five times the predetermined speed. When the address selector 23 receives the write address signal $WA_1$ and the read address signal $RA_1$ it selects the write address signal $WA_1$ in synchronization with write pulses generated during generation of the gate pulses $GP_1$, i.e., in synchronization with a high level AND output of the AND circuit 26 to set the memory 12 in a write mode, and selects the read address signal $RA_1$ in synchronization with read pulses, to set the memory 12 in a read mode. More specifically, a digital sound signal is written to the memory 12 bit by bit continuously five times and then, 1-bit reading is performed once. FIG. 6(a) is a timing diagram for this writing and reading. In the left half in FIG. 6(a), the gate pulse $GP_1$ is being generated, so that continuous five bit writing and one bit reading are performed. On the contrary, in the right half, generation of the gate pulse $GP_1$ has been terminated, so that only reading is performed.

As described in the foregoing, writing and reading to and from the memory 12 are simultaneously initiated, and the digital sound signal written to the entire memory at high speed (five times the reading speed) is completely read out at a predetermined reading speed. Meanwhile, approximately 2.8 seconds is required for an address signal changed at 90 KHz to circulate around the 256 K-bit memory once, and approximately 0.56 seconds is required for an address signal changed at 90×5 KHz to circulate around the 256 K-bit memory once.

Then, the digital sound signal read out bit by bit from the memory 12 is converted into 6-bit parallel data by the serial-parallel converter 13 and then, applied to the D-A converter 14, to be converted into an analog signal in synchronization with the reference sampling pulse signal of 15 KHz. This analog signal is outputted from the terminal 25 as a sound output reproduced at the same speed as the recording speed.

As described in the foregoing, in the above described 5 multiple speed reproduction mode, the reproduced sound signal written to the memory 12 in a unit of 0.56 seconds is outputted with the time base thereof expanded five times, without interruption, as sound of a unit of 2.8 seconds.

When the 9 multiple speed reproduction mode is set in place of the above described 5 multiple speed reproduction mode, respective frequency-multiplying values of the "N" frequency multiplier 11 and the "N+1" frequency multiplier 16 are changed depending on the mode designating signal.

(2) 2 multiple speed reproduction mode:

In 2 multiple speed reproduction mode, an operation of writing a reproduced digital sound signal to the memory 12 is performed continuously two times at a writing speed two times a predetermined reading speed, and a reading operation is performed two times at the above described predetermined reading speed simultaneously with the initiation of this writing operation and then, the next writing operation and reading operation are further performed two times at the time point when the reading operation performed two times is terminated, unlike the above described 5 or 9 multiple speed reproduction mode. Therefore, in the 2 multiple speed reproduction mode, a reproduced sound signal which is continuous for 5.6 seconds can be derived. More specifically, at the time of 2 multiple speed reproduction mode, a period during which the sound signal is continuous becomes two times that at the time of the above described 5 multiple speed reproduction mode.

More specifically, in the embodiment shown in FIG. 1, the "N" frequency multiplier 11 frequency-multiplies a reference sampling pulse signal of 15 KHz by 2 according to information concerning multiple speed of a mode designating signal, to supply a pulse signal of 30 KHz to the A-D converter 9 as a A-D conversion pulse signal. A 6-bit digital sound signal obtained from this A-D converter 9 is transferred to the serial-parallel converter 10, to be serially supplied to the memory 12.

The "N+1" frequency multiplier 16 frequency-multiplies the reference clock pulse signal of 90 KHz according to the information concerning multiple speed of the mode designating signal. In addition, the read pulse generator 17 outputs the reference clock pulse signal of 90 KHz without any modification as read pulses, to apply the same to the read address generator 20. This read address generator 20 counts the applied read pulses, thereby to form a read address signal $RA_2$ (represented by a solid line in FIG. 3(c)) changed at a predetermined speed. In addition, the write pulse generator 18 stops the passage of the outputs from the "N+1" frequency-multiplier 16 when the read pulses are generated. Thus, the write pulse generator 18 generates write pulses continuously two times, and stops generation of the write pulses when the read pulses are generated. The write pulses are applied to the address information generator 19 and the address information generator 19 counts the applied write pulses, forming address information $AD_2$ (in FIG. 3(a)) changed at a speed two times that of a read address signal $RA_2$.

The gate pulse generator 21 generates gate pulses $GP_2$ (in FIG. 3(b)) which attain a high level in a period during which the read address signal $RA_2$ circulates once and attains a low level during the next circulating period when the mode designating signal designates the 2 multiple speed reproduction mode. The write address generating gate 22 is opened in the high level period in response to the gate pulses $GP_2$, to output information corresponding to two circulating periods of the address information $AD_2$ as a write address signal $WA_2$ (represented by a broken line in FIG. 3(c)).

Thus, as obvious from FIG. 3, a period during which the read address signal $RA_2$ circulates once at a predetermined speed, the write address signal $WA_2$ circulates two times at a speed two times the predetermined speed. Thereafter, in a period during which the read address signal $RA_2$ further circulates once, the write address signal $WA_2$ is not generated.

The address selector 23 selects the write address signal $WA_2$ in synchronization with write pulses generated during generation of the gate pulses $GP_2$ to set the memory 12 in a write mode, and selects the read address signal $RA_2$ in synchronization with the read pulses to set the memory 12 in a read mode. More specifically, a digital sound signal is written to memory 12 bit by bit twice and then, 1-bit reading is performed once. FIG. 6(b) is a timing diagram for this writing and reading. In the left half in FIG. 6(b), the gate pulse $GP_2$ is being generated, so that continuous two writing and one reading are performed. On the contrary, in the right half, generation of the gate pulse $GP_2$ has been terminated, so that only reading is performed.

As described in the foregoing, writing and reading to and from the memory 12 are simultaneously initiated, so that the digital sound signal written to the entire memory two times at a speed two times the reading speed is completely read out by circulating all addresses two times at the predetermined reading speed.

Then, the digital sound signal read out from the memory 12 bit by bit is converted into 6-bit parallel data by the serial-parallel converter 13 and then, applied to the D-A converter 14, to be converted into an analog signal in synchronization with the reference sampling pulse signal of 15 KHz. This analog signal is outputted from the terminal 25 as a sound signal reproduced at the same speed as the recording speed.

As described in the foregoing, in the above described 2-multiple speed reproduction mode, the reproduced sound signal written continuously two times is read out continuously two times, so that a sound signal which is continuous for 5.6 seconds is derived without interruption.

(3) ½ multiple speed continuous slow reproduction:

In ½ multiple speed continuous slow reproduction mode, an operation of continuously writing a reproduced digital sound signal to the memory 12 is performed at a writing speed of one-half of a predetermined reading speed, and a reading operation is performed at a predetermined reading speed in parallel with this writing operation. Therefore, in the ½ multiple speed continuous slow reproduction mode, a sound signal which is continuous for 2.8 seconds is derived two times.

More specifically, in the embodiment shown in FIG. 1, the "N" frequency multiplier 11 frequency-multiplies a reference sampling pulse signal of 15 KHz by ½ according to information concerning multiple speed of a mode designating signal, to supply a pulse signal of 7.5 KHz to the A-D converter 9 as a A-D conversion pulse signal. A 6-bit digital sound signal obtained from this A-D converter 9 is transferred to the parallel-serial converter 10, to be serially supplied to the memory 12.

The "N+1" frequency multiplier 16 frequency-multiplies the reference clock pulse signal of 90 KHz by 1.5 according to the information concerning multiple speed of the mode designating signal. In addition, the read pulse generator 17 outputs the reference clock pulse signal of 90 KHz without any modification as read pulses, to apply the same to the read address generator 20. This read address generator 20 counts the applied read pulses, forming a read address signal $RA_3$ (represented by a solid line in FIG. 4(b)) changed at a predetermined speed.

Additionally, the write pulse generator 18 receives an output from the "N+1" frequency multiplier 16 to generate write pulses. The output from the "N+1" frequency multiplier 16 comprises pulses which coincide in phase with the reference clock pulses and additional pulses generated at a rate of one per two cycles of the reference clock pulses. Thus, the pulses which coincide in phase with the read pulses, i.e., the reference clock pulses of the output of the "N+1" frequency multiplier 16 are picked out. As a result, the write pulse generator 18 generates write pulses having a cycle two times that of the reference clock pulse signal. These write pulses are applied to the address information generator 19. The address information generator 19 counts the applied write pulses, form address information $AD_3$ (in FIG. 4(a)) changed at a speed of one-half of that of the read address signal $RA_3$.

The gate pulse generator 21 always applies a high level output when the mode designating signal designates the ¼ multiple speed continuous slow reproduction mode. Thus, the write address generating gate 22 is always opened, so that the address information $AD_3$ is outputted without any modification as a write address signal $WA_3$ (represented by a broken line in FIG. 4(b)).

Thus, as obvious from FIG. 4, in a period during which the read address signal $RA_3$ circulates once at a predetermined speed, the write address signal $WA_3$ designates only the half of all addresses in the memory at a speed of one-half of a predetermined speed. Thereafter, in a period during which the read address signal $RA_3$ circulates once at a predetermined speed, the write address signal $WA_3$ designates the remaining addresses.

The address selector 23 selects the write address signal $WA_3$ in synchronization with the write pulse to set memory 12 in write mode, and selects the read address signal $RA_3$ in synchronization with the read pulses to set memory 12 in read mode. FIG. 6(c) is a timing diagram for this writing and reading to and from memory 12. In this case, since the output of the gate pulse generator 21 is always at a high level, the left half and the right half in FIG. 6(c) are the same. More specifically, a reading operation is performed in synchronization with the read pulses (reference clock pulses) while a writing operation is performed at a rate of one per two cycles thereof. More specifically, the reading speed to the memory 12 is 90 KHz, and the writing speed therefrom is 45 KHz.

As obvious from FIG. 4, the data which was written in the previous one write cycle is read out again in one read cycle in the first half in one write cycle, and the data which is presently being written in one read cycle in the second half thereof is read out. Such a cycle is repeated, so that the same data is read out twice.

Then, a digital sound signal read out bit by bit from the memory 12 is converted into 6-bit parallel data by the serial-parallel converter 13 and then, applied to the D-A converter 14, to be converted into an analog signal in synchronization with the reference sampling pulse signal of 15 KHz. This analog signal is outputted from the terminal 25 as a sound signal reproduced at the same speed as the recording speed.

As described in the foregoing, in the above described ¼ multiple speed continuous slow reproduction mode, writing and reading are always performed, so that a sound signals which is continuous for 2.8 seconds is derived without interruption two times.

(4) In 5 multiple speed reverse reproduction mode:

In this 5 multiple speed reverse reproduction mode, a sound signal reproduced in a period of one-sixth of a reading cycle is written to a memory with the address being reversed, to define timings for writing such that the termination of such writing and the initiation of reading coincide with each other. Therefore, in the 5 multiple speed reverse reproduction mode, a sound signal which is continuous for approximately 2.3 seconds can be derived.

More specifically, in the embodiment shown in FIG. 1, the "N" frequency multiplier 11 frequency-multiplies a reference sampling pulse signal of 15 KHz by 5 according to information concerning multiple speed of a mode designating signal, to supply a pulse signal of 75 KHz to the A-D converter 9 as a A-D conversion pulse signal. A 6-bit digital sound signal obtained from this A-D converter 9 is transferred to the parallel-serial converter 10, to be serially supplied to the memory 12.

On the other hand, the "N+1" frequency multiplier 16 frequency-multiplies the reference clock pulse signal of 90 KHz by 6 according to the information concerning multiple speed of the mode designating signal. In addition, the read pulse generator 17 outputs the reference clock pulse signal of 90 KHz without any modification as read pulses, to apply the same to the read address generator 20. This read address generator 20 counts the applied read pulses, forming a read address signal $RA_4$ (represented by a solid line in FIG. 5(c)) changed at a predetermined speed.

Additionally, the write pulse generator 18 picks out pulses which coincide in phase with the read pulses, i.e., the reference clock pulses of an output from the "N+1" frequency multiplier 16 to form write pulses, to apply the same to the address information generator 19. The address information generator 19 is set in a count mode by subtraction based on information concerning direction of the mode designating signal, which counts by subtraction of the applied write pulses, forming address information $AD_4$ (in FIG. 5(a)) changed at a speed five times that of the read address signal $RA_4$.

When a mode designating signal designates the 5 multiple speed reverse reproduction mode, the gate pulse generator 21 divides each of continuous cycles of the read address signal $RA_4$ into six sections, to generate a gate pulse $GP_4$ (in FIG. 5(b)) which attains a high level at a rate of one section per five sections thereof. The write address generating gate 22 is opened in the high level period in response to the gate pulses $GP_4$, to output the address information $AD_4$ as a write address signal $WA_4$ (represented by a broken line in FIG. 5(c)) at a rate of one section per five sections.

The address selector 23 selects the write address signal $WA_4$ in synchronization with write pulses generated during generation of the gate pulses $GP_4$ to set the memory 12 in a write mode, and selects the read address signal $RA_4$ in synchronization with the read pulses to set the memory 12 in a read mode. FIG. 6(d) is a timing diagram for for this writing and reading. In the left half in FIG. 6(d), the gate pulse $GP_4$ is being generated, so that continuous five bit writing and one bit reading are performed. On the contrary, in the right half, generation of the gate pulse $GP_4$ has been terminated, so that only reading is performed.

More specifically, as shown in FIG. 5, the digital sound signal written at addresses generated by counting operation by addition in the memory 12 in a period from "a" to "b" is read out, with the time-base thereof expanded, from the addresses in reverse order obtained by counting operation by subtraction during a period from "b" to "d", the digital sound signal written in the memory 12 in a similar manner during a period from "c" to "d" is read out, with the time-base expanded, from the addresses in reverse order in the similar manner during a period from "d" to "f", and the digital sound signal written in the memory 12 in the similar manner during a period from "e" to "f" is read out, with the time-base expanded, from the addresses in reverse order in the similar manner during a period from "f" to "h".

The digital sound signal read out bit by bit from the memory 12 is converted into 6-bit parallel data by the serial-parallel converter 13 and then, applied to the D-A converter 14, to be converted into an analog signal in synchronization with the reference sampling pulse signal of 15 KHz. This analog signal is outputted from the terminal 25 as a sound signal reproduced at the same speed as the recording speed.

As described in the foregoing, in the above described 5 multiple speed reverse reproduction mode, reading is performed in a cycle of five-sixth of that of the read address signal, so that a sound signal which is continuous for approximately 2.3 seconds is derived without interruption.

Meanwhile, when the 9 multiple speed reverse reproduction mode is set in place of the above described 5 multiple speed reverse reproduction mode, it is necessary to change respective frequency-multiplying values of the "N" frequency multiplier 11 and the "N+1" frequency multiplier 16 according to the information concerning multiple speed of the mode designating signal. In addition, it is further necessary that the gate pulse generator 21 generates gate pulses in a cycle corresponding to nine-tenth of one cycle of the read address signal only during a period corresponding to one-tenth of one cycle thereof.

Additionally, more generally, in the N multiple speed reverse reproduction mode, it is necessary that the gate pulse generator 21 generates gate pulses in a cycle corresponding to N/(N+1) of one cycle of the read address signal only during a period corresponding to 1/(N+1) of one cycle thereof.

As described in the foregoing, according to one embodiment of the present invention, a reproduced sound signal which is considerably long continuous can be derived without interruption.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound reproducing apparatus comprising:
means (1, 2, 3, 4, 5, 6, 7, 8) for scanning a recording media having at least a sound signal recorded thereon at a predetermined recording speed, in the direction opposite to that at the time of recording at a reproducing speed N (N: positive integer) times said predetermined recording speed to reproduce said sound signal,
memory means (12) to which and from which a digital signal can be written and read out,
read address generating means (15, 17, 20) for generating a read address signal changed in one direction in a predetermined cycle for specifying an address at which the digital signal is to be read from said memory means,
means (15, 16, 18, 19) for generating address information changed in the direction opposite to that of said read address signal at a speed N times that of said read address signal,
address generating means (21, 22) for supplying said address information as a write address signal for specifying an address at which the digital signal is to be written to said memory means in a cycle corresponding to N/(N+1) times said predetermined cycle of said read address signal and only during a first period corresponding to 1/(N+1) times said predetermined cycle of said read address signal,
address supplying means (17, 18, 23, 26) for supplying said read address signal to said memory means when said read address signal is generated and supplying said write address signal to said memory means when said write address signal is generated during the first period,
means (9, 10, 11, 15) for converting the sound signal reproduced by said reproducing means into a digital signal at a first speed proportional to said reproducing speed and writing the same to the address specified by said write address signal in said memory means, and
means (13, 14, 15) for reading out said digital sound signal from the address specified by said read address signal in said memory means at a second speed proportional to said recording speed and converting the same into an analog signal.

2. A sound reproducing apparatus comprising:
means (1, 2, 3, 4, 5, 6, 7, 8) for scanning a recording media having at least a sound signal recorded thereon at a predetermined recording speed, in the same direction as that at the time of recording at a reproducing speed of one-half of said predetermined recording speed to reproduce said sound signal,
memory means (12) to which and from which a digital signal can be written and read out,
read address generating means (15, 17, 20) for generating a read address signal changed in one direction in a predetermined cycle for specifying an address at which the digital signal is to be read from said memory means,
write address generating means (15, 16, 18, 19, 21, 22) for generating a write address signal changed in the same direction as that of said read address signal in synchronization with the initiation of the change in said read address signal and in a cycle two times said predetermined cycle of said read address signal for specifying an address at which the digital signal is to be written to said memory means,
address supplying means (17, 18, 23, 26) for supplying said read address signal to said memory means when said read address signal is generated and supplying said write address signal to said memory means when said write address signal is generated,
means (9, 10, 11, 15) for converting the sound signal reproduced by said reproducing means into a digital signal at a first speed proportional to said reproducing speed and writing the same to the address specified by said write address signal in said memory means, and
means (13, 14, 15) for reading out said digital sound signal from the address specified by said read address signal in said memory means at a second speed proportional to said recording speed and converting the same into an analog signal.

3. A sound reproducing apparatus comprising:
means (1, 2, 3, 4, 5, 6, 7, 8) for scanning a recording media having at least a sound signal recorded thereon at a predetermined recording speed, in the same direction as that at the time of recording at a reproducing speed two times said predetermined recording speed to reproduce said sound signal,
memory means (12) to which and from which a digital signal can be written and read out,
read address generating means (15, 17, 20) for generating a read address signal changed in one direction in a predetermined cycle for specifying an address at which the digital signal is to be read from said memory means, means (15, 16, 18, 19) for generating address information changed in the same direction as that of said read address signal at a speed two times that of said read address signal, write address generating means (21, 22) for supplying said address information as a write address signal for specifying an address at which the digital signal is to be written to said memory means in a cycle two times said predetermined cycle of said read address signal and only during a first period corresponding to said predetermined cycle of said read address signal, address supplying means (17, 18, 23, 26) for supplying said read address signal to said memory means when said read address signal is generated and supplying said write address signal to said memory when said write address signal is generated in the first period, means (9, 10, 11, 15) for converting the sound signal reproduced by said reproducing means into a digital signal at a first speed proportional to said reproducing speed and writing the same to the address specified by said write address signal in said memory means, and means (13, 14, 15) for reading out said digital sound signal from the address specified by said read address signal in said memory means at a second speed proportional to said recording speed and converting the same into an analog signal.

* * * * *